United States Patent
Dash et al.

(10) Patent No.: US 9,135,268 B2
(45) Date of Patent: Sep. 15, 2015

(54) LOCATING THE LATEST VERSION OF REPLICATED DATA FILES

(75) Inventors: Prasanta Dash, San Jose, CA (US); Craig Harmer, San Francisco, CA (US); Vishal Kher, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 453 days.

(21) Appl. No.: 12/650,147

(22) Filed: Dec. 30, 2009

(65) Prior Publication Data

US 2011/0161335 A1 Jun. 30, 2011

(51) Int. Cl.
*G06F 17/30* (2006.01)

(52) U.S. Cl.
CPC ................ *G06F 17/30194* (2013.01)

(58) Field of Classification Search
USPC .......................................... 707/758
See application file for complete search history.

(56) References Cited

U.S. PATENT DOCUMENTS

| | | | |
|---|---|---|---|
| 6,490,693 B1 | 12/2002 | Briskey et al. | |
| 6,807,558 B1* | 10/2004 | Hassett et al. | 709/203 |
| 2003/0188160 A1* | 10/2003 | Sunder et al. | 713/165 |
| 2004/0249965 A1* | 12/2004 | Huggins et al. | 709/231 |
| 2005/0268154 A1 | 12/2005 | Wipfel et al. | |
| 2008/0077635 A1* | 3/2008 | Sporny et al. | 707/204 |
| 2011/0066666 A1* | 3/2011 | Takaoka et al. | 707/816 |

OTHER PUBLICATIONS

Herlihy, Maurice, Dynamic Quorum Adjustment for Partitioned Data, ACM Transactions on Database Systems, vol. 12, No. 2, Jun. 1987, pp. 170-194.
Naor, Moni, et al., Scalable and Dynamic Quorum Systems, Distributed Computing, vol. 17, No. 4 / May 2005, pp. 311-322.
HP Storage Works 4x00/6x00/8x00 Enterprise Virtual Array Configuration Best Practices White Paper; 2007.
Understanding How Cluster Quorums Work; Windows Networking. com; www.windowsnetworking.com/articles_tutorials/Cluster-Quorums.html?printversion; Published Jan. 13, 2005.

* cited by examiner

*Primary Examiner* — Hosain Alam
*Assistant Examiner* — Navneet K Gmahl
(74) *Attorney, Agent, or Firm* — Wilmer Cutler Pickering Hale and Dorr LLP (57) ABSTRACT

A list of servers known to a client is compared with lists of servers stored on the servers. An instance of content (e.g., a data file) can be accessed from a server on the list if at least a simple majority of the servers have the same version of the list.

19 Claims, 6 Drawing Sheets

| Time | Client 1 List | Client 2 List | Server A List | Server B List | Server C List | Server D List | Server E List | Server F List | Server G List |
|---|---|---|---|---|---|---|---|---|---|
| T0 | ABC[1] | ABC[1] | ABC(1)[1] | ABC(1)[1] | ABC(1)[1] | -- | -- | -- | -- |
| T1 | ABD[2] | ABC[1] | ABD(1)[2] | ABD(1)[2] | ABC(1)[1] | ABD(1)[2] | -- | -- | -- |
| T2 | ABD[2] | ABD[2] | ABD(1)[2] | ABD(1)[2] | ABC(1)[1] | ABD(1)[2] | -- | -- | -- |
| T3 | BDE[3] | ABD[2] | ABD(1)[2] | BDE(1)[3] | ABC(1)[1] | BDE(1)[3] | BDE(1)[3] | -- | -- |
| T4 | B{D}E[3] | ABD | ABD(1) | BDE(2) | ABC(1) | BDE(1) | BDE(2) | -- | -- |
| T5 | BEF[4] | ABD[2] | ABD(1)[2] | BEF(2)[4] | ABC(1)[1] | BDE(1)[3] | BEF(2)[4] | BEF(2)[4] | -- |
| T6 | {B}EF[4] | ABD | ABD(1) | BEF(2) | ABC(1) | BDE(1) | BEF(3) | BEF(3) | -- |
| T7 | EFG[5] | ABD[2] | ABD(1)[2] | BEF(2)[4] | ABC(1)[1] | BDE(1)[3] | EFG(3)[5] | EFG(3)[5] | EFG(3)[5] |

[N] = Server List Version; (N) = File Version; { } = Inaccessible Server

LOCATING THE LATEST VERSION OF REPLICATED DATA FILES

BACKGROUND

In a distributed file storage system, file data can be copied or replicated on multiple servers in order to make that data available even in the event of one or more server failures. It is important that each client that wishes to access that data knows where the latest version of that data can be found.

However, the location of each copy of the file is dynamic and thus can change over time. For example, a distributed file storage system is bound to experience failures or maintenance issues that result in one or more servers being taken offline. Generally speaking, there will be occasions in which a server is inaccessible to clients.

In the event a server becomes unavailable, the file storage system will invoke a failover protocol that results in the data that was on that server being replicated on a different server. For example, if a file on server A is replicated on server B, and server B becomes unavailable for some reason, the file on server A is again replicated on server C (alternatively, the file on server B can perhaps be migrated to server C). In any event, the location of the replica has changed.

Thus, the lists of servers that store the replicas must be updated as new replicas are created or as the locations of the replicas are changed. Conventional approaches for updating such lists can be problematic. For instance, a brute force search in which all servers in the system are contacted and polled can be performed. However, such an approach is inefficient.

Also, conventional approaches for maintaining updated copies of such lists can be problematic. For instance, it is necessary to make sure that each client has an up-to-date list for the files that client wishes to access. A client with an out-of-date or stale list may access invalid data or may not be able to locate valid data.

Clients can also go offline at unpredictable times for unpredictable intervals, exacerbating the problem of keeping their server lists up-to-date. For example, clients 1 and 2 may both access a file that is replicated on servers A and B. On Monday, client 1 may be taken offline; on Tuesday, servers A and B may be taken offline and replaced with servers C and D. Client 2 can be updated with the new location information, but the server list on client 1 will be stale. On Wednesday, client 2 may be offline, and client 1 may return to service. Therefore, client 1 cannot retrieve the updated server list from client 2 but still needs to obtain an updated list in some manner. Many similar types of scenarios are possible.

In summary, the combination of multiple copies of data (some of those copies valid, and some of those copies invalid or out-of-date), multiple storage locations, changing server availability, and changing client availability makes it difficult to efficiently identify, distribute, and maintain up-to-date location information for the most recent version of each instance of replicated data.

SUMMARY

In one embodiment, a list of servers known to a client is compared with the list of servers stored on each server. The servers may be part of a distributed file system, for example, and an instance of content (e.g., a file) may be replicated on multiple servers. The client is allowed to access the file from a server on the list known to the client if at least a simple majority of the servers have the same version of the server list and/or file.

The version of the file may be indicated using a version number and/or a time stamp. In one embodiment, a checksum of the file is computed.

In another embodiment, a first plurality of servers is identified during a first phase of a search for lists of servers. After the first phase, the search can be propagated through succeeding pluralities of servers, where each succeeding plurality of servers is selected based upon lists of servers stored on a plurality of a servers identified in a preceding phase of the search. A latest list of servers can be identified, where the latest list is selected from matching lists on a quorum of a plurality of servers identified during the search. Data stored on a server included in the latest list can then be accessed.

In yet another embodiment, a first list affiliated with a first data file is accessed. The first list identifies a plurality of servers on which replicas of the first data file are stored. Data can be written to a set of the replicas stored on a quorum of at least a simple majority of the plurality of servers. A second list can be affiliated with the set of replicas that are written to, where the second list includes listings identifying the quorum of servers, and where the second list and the replicas are stored on the quorum of servers.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "identifying," "propagating," "searching," "comparing," "selecting," "accessing," "computing," "reading," "writing," "replicating," "associating," "affiliating," or the like, refer to actions and processes (e.g., the flowcharts 300, 600, 800, and 900 of FIGS. 3, 6, 8, and 9, respectively) of a computer system or similar electronic computing device or processor (e.g., system 210 of FIG. 2). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above can also be included within the scope of computer-readable storage media.

Figure 1:
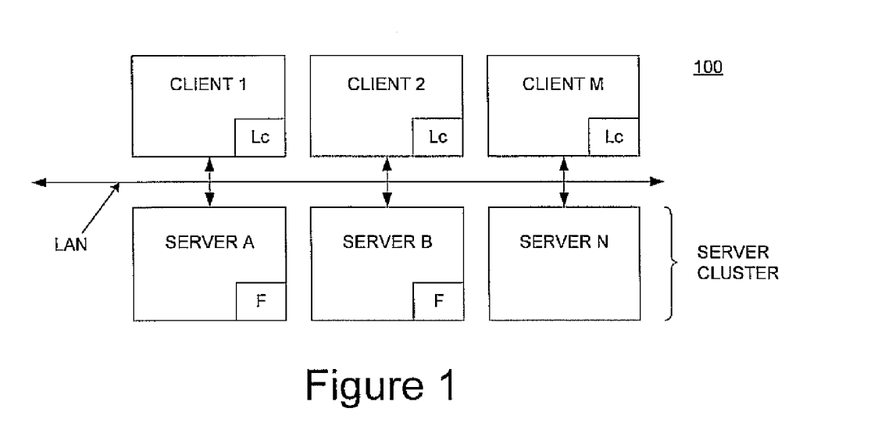
FIG. 1 is a block diagram depicting a network upon which embodiments of the present disclosure may be practiced.

FIG. 1 is a block diagram depicting a network 100 upon which embodiments of the present disclosure may be used. The network 100 may be known as a cluster file system, network file system, or storage area network. In general, the network 100 is a network in which a set of computers (e.g., the system 210 of FIG. 3) can perform input/output (I/O) operations using, in one embodiment, a network of object storage devices that utilizes Internet Protocol (IP)-based storage and remote procedure calls.

In the example of FIG. 1, the network 100 includes servers A, B, . . . , N, which may be referred to herein as "server nodes." Collectively, the server nodes may be referred to as a "server cluster." The server nodes may be data servers that communicate with metadata servers (not shown), or the server nodes may be data servers that perhaps incorporate the functionality of a metadata server.

The clients 1, 2, . . . , M, which may be referred to herein as "client nodes," can access the servers A, B, . . . , N, via a local area network (LAN), storage area network (SAN), or wide area network (WAN). Also, the client nodes may communicate with each other, and the server nodes may communicate with each other, via the LAN, SAN, or WAN.

An instance of content—for example, a data file F—may be replicated on multiple server nodes so that it is still available (accessible) even if one or more of the servers on which the file is stored should become inoperative or unavailable for some reason. Each client node that has access to the file F can store (cache) a list Lc of servers on which the file F is replicated (in addition to a server list, a client node can store other information needed to contact a server node and read from or write to the file, such as a password). Over time, a client's list Lc may become stale. For example, the client node may be offline for some time, and the servers on which the replicated versions of the file F are stored may change during that time. According to embodiments of the present disclosure, a client node can find the most recent version of the replicas even if the client starts its search with a server list that may be stale. It is also possible that some or all of the server nodes on which the latest version of the file is stored may be inaccessible to a client node for some reason; in that case, according to embodiments of the present disclosure, it is at least possible for the client node to determine that it does not have the most recent version of the file.

In one embodiment, client 1 may be referred to a "primary client" or "master client" while client 2 may be referred to as a "secondary client." In general, a primary client is responsible for choosing the list of servers that will store the replicated data files F, and for modifying, growing, or shrinking that list in the event of server unavailability or failure, or for load balancing. Standard, known mechanisms may be used to select the primary client from amongst multiple contending clients, even in split-brain situations—such mechanisms are known but are outside the scope of the present disclosure. If the client serving as the primary client goes offline, for example, then the role of primary client is assumed by another client. Embodiments according to the present disclosure can be practiced by a client regardless of whether that client is acting as a primary client or as a secondary client. That is, while the roles played by primary and second clients may be relevant to establishing and maintaining a list of servers that store replicas of the file F, both primary and secondary clients can employ the techniques described herein to find the most recent version of the replicas.

Figure 2:
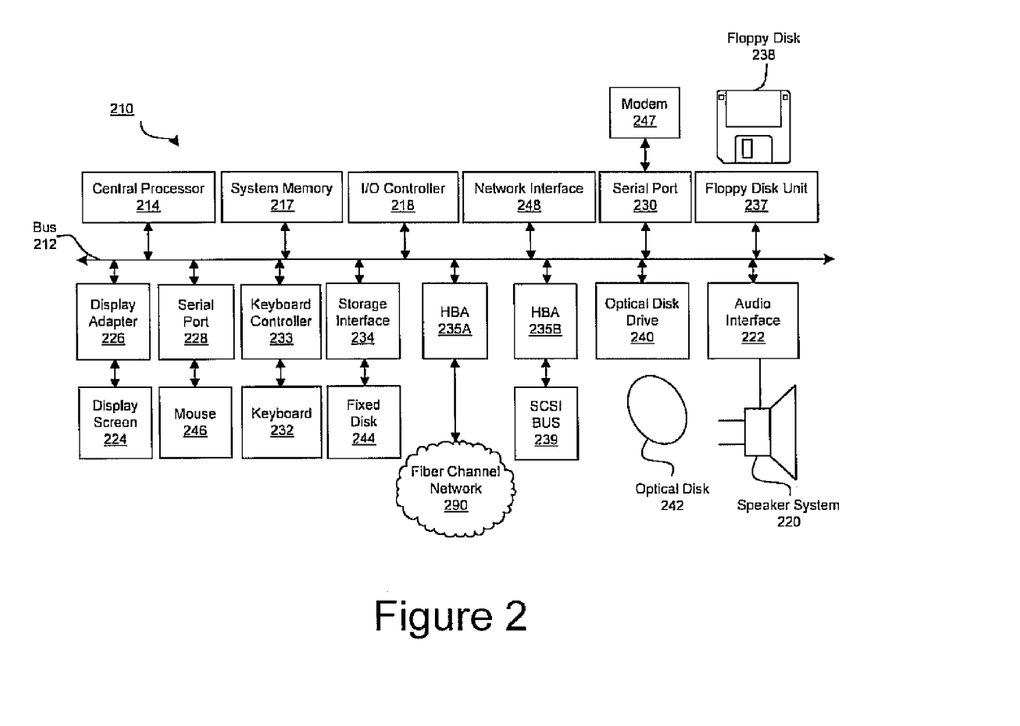
FIG. 2 is a block diagram of a computer system upon which embodiments of the present disclosure may be practiced.

With reference first to FIG. 2, a block diagram of a computer system 210 suitable for implementing the present disclosure is depicted. In the discussion to follow, various and numerous components and elements are described. Various combinations and subsets of those components can be used to implement the devices mentioned in conjunction with FIG. 1. For example, the clients 1, 2, ..., M may each be a full-function computer system that employs many if not all of the features of the computer system 210. However, the servers A, B, ..., N may utilize only the subset of those features needed to support the functionality provided by those devices. For example, the servers A, B, ..., N may not need a keyboard or display, and may execute a relatively sparse operating system that supports the functionality of data storage and data access and the management of such functionality.

In the example of FIG. 2, the computer system 210 includes a bus 212 which interconnects major subsystems of the computer system. These subsystems include a central processor 214; a system memory 217; an input/output controller 218; an external audio device, such as a speaker system 220 via an audio output interface 222; an external device, such as a display screen 224 via display adapter 226; serial ports 228 and 230; a keyboard 232 (interfaced with a keyboard controller 233); a storage interface 234; a floppy disk drive 237 operative to receive a floppy disk 238; a host bus adapter (HBA) interface card 235A operative to connect with a Fibre Channel network 290; an HBA interface card 235B operative to connect to a Small Computer System Interface (SCSI) bus 239 (alternatives to SCSI include Integrated Development Environment (IDE) and Serial Advanced Technology Attachment (SATA)); and an optical disk drive 240 operative to receive an optical disk 242. Also included are a mouse 246 (or other point-and-click device, coupled to bus 212 via serial port 228); a modem 247 (coupled to bus 212 via serial port 230); and a network interface 248 (coupled directly to bus 212). The modem 247, network interface 248 or some other method can be used to provide connectivity to the network 100 of FIG. 1.

The bus 212 of FIG. 2 allows data communication between the central processor 214 and system memory 217, which may include ROM or flash memory and RAM (not shown), as previously noted. The RAM is generally the main memory into which the operating system and application programs are loaded. The ROM or flash memory can contain, among other code, the Basic Input-Output System (BIOS) which controls basic hardware operation such as the interaction with peripheral components.

Applications resident within the computer system 210 are generally stored on and accessed via a computer-readable storage medium, such as a hard disk drive (e.g., the fixed disk 244), an optical drive (e.g., the optical drive 240), a floppy disk unit 237, or other storage medium. Applications can be in the form of electronic signals modulated in accordance with the application and data communication technology when accessed via network modem 247 or interface 248.

Continuing with reference to FIG. 2, storage interface 234, as with the other storage interfaces of computer system 210, can connect to a standard computer-readable storage medium for storage and/or retrieval of information, such as a fixed disk drive 244. The fixed disk drive 244 may be a part of the computer system 210, or it may be separate and accessed through other interface systems. The modem 247 may provide a direct connection to a remote server via a telephone link or to the Internet via an internet service provider (ISP). The network interface 248 may provide a direct connection to a remote server via a direct network link to the Internet via a POP (point of presence). The network interface 248 may provide such a connection using wireless techniques, including digital cellular telephone connection, Cellular Digital Packet Data (CDPD) connection, digital satellite data connection, or the like.

Many other devices or subsystems (not shown in FIG. 2) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of the system memory 217, fixed disk 244, optical disk 242, or floppy disk 238. The operating system provided on the computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
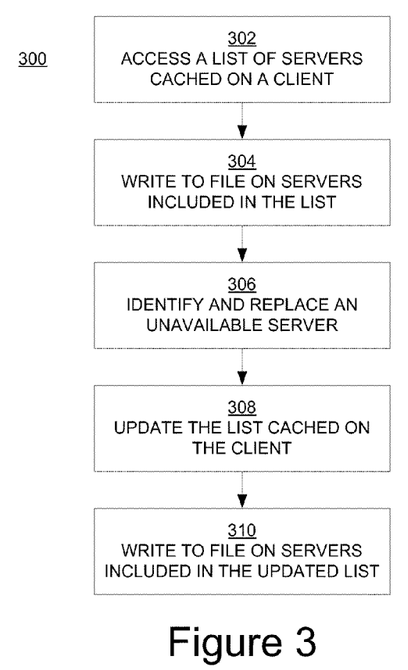
FIG. 3 is a flowchart illustrating an embodiment of a computer-implemented method for writing data to replicated files.

FIG. 3 is a flowchart 300 illustrating an embodiment of a computer-implemented method for writing data to replicated server-based files. Although described in the context of data files, embodiments described herein can be generally applied to other forms of replicated content, including the list of servers mentioned above and below. Flowchart 300 can be implemented as computer-executable instructions residing on some form of computer-readable storage medium (e.g., in a memory subsystem or unit of the system 210 of FIG. 2). More specifically, the method described by the flowchart 300 can be performed by any of the client nodes of FIG. 1. Not all of the steps included in the flowchart 300 may be performed, and the steps may be performed in a different order than described. FIG. 3 is described in conjunction with FIGS. 4A, 4B, 5A, and 5B.

Figure 4A:
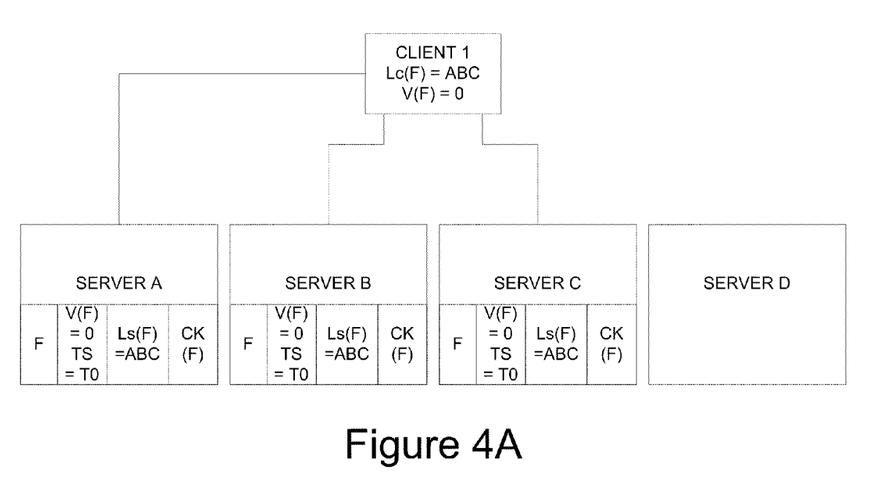
FIGS. 4A and 4B are block diagrams depicting data being written to replicated files according to an embodiment of the present disclosure.

In block 302 of FIG. 3, at time T0, a client node (e.g., client 1) accesses (reads) the list of servers Lc cached by the client. The list Lc is cached by client 1 in persistent memory (e.g., the fixed disk 244 of FIG. 2). At time T0, the list Lc includes listings for servers A, B, and C, as shown in FIG. 4A. Embodiments of methods and systems for updating the list Lc are discussed in conjunction with FIGS. 6 and 7, further below.

Client 1 can communicate the list Lc to other clients (e.g., client 2) in a best effort manner. Client 2 may be offline or for some other reason may not be able to receive the list Lc from client 1. However, as will be seen from the discussion of FIGS. 6 and 7 and in accordance with embodiments of the present disclosure, client 2 can locate the most recent version of the file F even if the client is offline or otherwise out of touch for an extended period and the file F has been modified and/or moved to different server nodes during that period.

Continuing with reference to FIGS. 3, 4A, 4B, 5A, and 5B, in one embodiment, a list of servers Ls is also stored on each server node along with each of the replicated files F. A version of the list Ls may be included in each replica file F, it may be an attribute or property of each file, or each file may point to a respective list. Although the file F is replicated across multiple nodes, the list Ls may be different across those server nodes. In other words, the list Ls affiliated with the copy of the file F on server A may be different from the list Ls affiliated with the copy of the file F on server B. However, the number of servers on which a particular list Ls is stored need not match the number of servers on any version of that particular list. The role of the list Ls is described more fully in conjunction with FIGS. 6 and 7, below.

Continuing with reference to FIGS. 3, 4A, 4B, 5A, and 5B, in one embodiment, version information is also maintained along with each of the replicated files F. Although the file F is replicated across multiple nodes, the version information may be different across those server nodes. In other words, the version information affiliated with the copy of the file F on server A may be different from the version information affiliated with the copy of the file F on server B.

The version information may include a version number V and/or a time stamp TS. A first version number may be associated with each replica file F, and a second version number may be associated with each server list Ls; that is, there may be two version numbers, one for the file and one for the list of servers—the version number for the file and the version number for the server list can be different. For example, the files and the server lists may not be updated in concert; the replicated files may be updated multiple times before there is a change to the list of servers on which the replicated files are stored, or the server list may be updated as part of a failover protocol. Alternatively, a single version number may be associated with both the file and the list of servers; that version number is updated each time the file is updated and, in one embodiment, the list of servers is included in the file.

Figure 7:
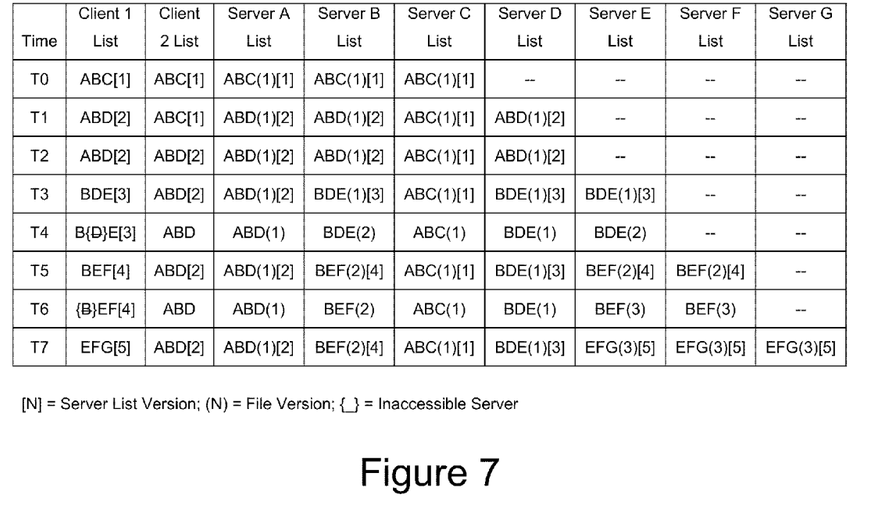
FIG. 7 is a table illustrating an embodiment of a computer-implemented method for locating a latest version of a replicated file.

The use of a separate version number for the server list facilitates the search for the latest version of the list, as will be seen from the discussion of FIG. 7; however, the examples of FIG. 7 also illustrate that a separate version number for the server list is not required. In a similar fashion, multiple time stamps (one for the file, and one for the server list) or a single time stamp (for both file and server list) may be utilized. In the examples of FIGS. 4A, 4B, 5A, and 5B, a single version number and a single time stamp are used for simplicity of discussion. At time T0, the version number V is set to version V0, and the time stamp TS is set to T0, as shown in FIG. 4A.

In one embodiment, file validation information CK is also maintained along with each of the replicated files F. The file validation information may also be referred to as a "message digest." In one embodiment, the file validation information CK is a checksum. The checksum may be computed on the entire contents of the file F or a part of the file's contents, or it may be computed on the tuple of the file contents, the version information V and TS, and the list Ls on the server. A checksum of the checksum may also be used.

Other information useful for implementation of the present disclosure may be included in or associated with the replicated files. For example, a file may include information that specifies the minimum and/or maximum number of file copies, the number of servers that constitute a quorum, and/or a flag that indicates whether there is a write in progress.

Figure 4B:
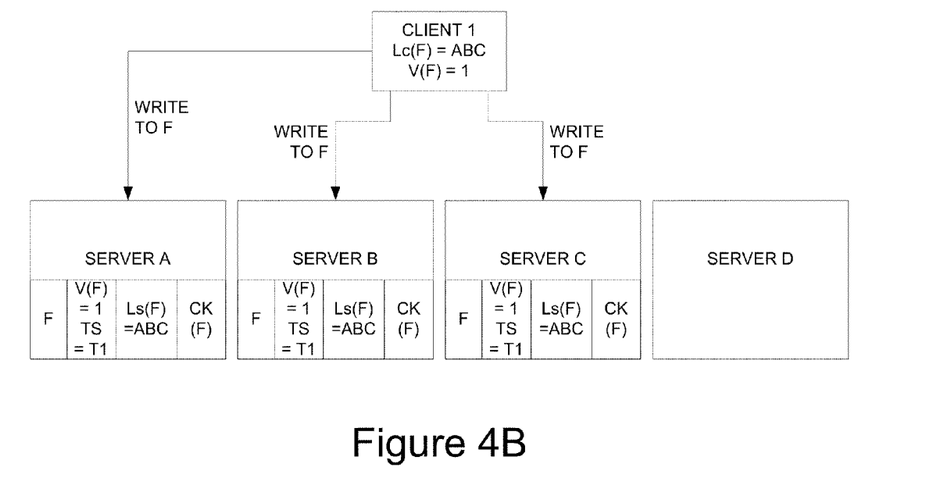

In block 304 of FIG. 3, with reference also to FIG. 4B, client 1 writes (or attempts to write) data to each copy of the file F at time T1. The write is considered successful if the file F is successfully modified on a quorum of the servers listed in the list Lc on the client. In one embodiment, a quorum includes at least a "simple majority" (more than half) of the servers in the list Lc. Well known techniques can be used for atomicity to ensure that a write either succeeds on a majority of servers or fails without leaving partial results. Similarly, a modification that results in performing multiple writes to servers can be made atomic using those techniques. All writes due to a modification either succeed on a majority of servers or fail without partial results.

In one embodiment, after a copy of the file F is successfully modified, then the version information V associated with that copy is updated, and new file validation information CK is computed for that copy. In other words, for example, once the copy of the file F on server A is modified, then the associated version information on server A is updated, and new file validation information CK is computed for the copy of the file on server A and updated on server A. In a similar fashion, the version information (e.g., the version number for the file) and file validation information (e.g., the checksum) associated with the copy of file F that is on server B is updated once the copy of the file F on server B is successfully updated, and so on for each of the other server nodes. In the example of FIG. 4B, once a copy of the file F is modified, the time stamp TS associated with that copy is set to time T1, and the version number V associated with that copy is increased monotonically from 1 to 2. Alternatively, certain file attributes, such as version information, can be updated before the file is updated or at the same time that the file is being updated. Also, it is possible to defer updates of file attributes, such as version information, until copies of the file are updated on a quorum of the servers on the server list (in other words, file attributes may not be updated until a quorum of the replicated files is updated).

As described further below, in one embodiment, the version information is used along with the server-based lists Ls to determine whether the most recent version of the file F is being accessed by clients. In one embodiment, the file validation information CK is used to ensure that the most recent version of the file F is valid and consistent with its replicas. For example, it may take K messages from the client to update each copy of the file F. A client might successfully transmit all K messages to server A, but may not be able to transmit all K messages to server B (e.g., the client may go offline in the midst of transmitting those messages). The file validation information CK (e.g., a checksum) can be used to detect that the copy of the file F on server A is complete and the copy of the file on server B is incomplete. The use of checksums in this manner is well known.

In a scenario in which multiple clients update a file, one client (e.g., the primary client) can decide when all data for the next version of the file has been transmitted, and can execute the operations described above (refer to discussion of block 304).

In block 306 of FIG. 3, one of the servers (e.g., server C) becomes unavailable for some reason, and consequently a failover (replacement) protocol or scheme is implemented to replace server C with another server D. Failover protocols are well known in the art and so are not further described herein. The selection of a replacement server can take into account information such as failure domains and locality as well as other criteria. The replacement server may be selected by one of the server nodes, or by a client node designated to perform that task (e.g., the primary client). If replacement of multiple servers from the list is needed, then each server can be replaced one by one. Alternatively, they can be updated at the same time if the update succeeds on a majority of the current list of servers and a majority of the new servers.

In general, a failover or replacement protocol performs as follows. For the purposes of this example, assume the server lists on the servers initially include five servers U, V, W, X, and Y, but server Y fails and is to be replaced by server Z. Clients can optionally be told that the server list is about to change, and they may also be sent a provisional list of new servers. Before the transition from server Y to server Z is completed, the server list <U, V, W, X, and Y> and/or file may be written to server Z (by the primary client, for example; in general, by any node that is trying to update the file and file version). An attempt is then made to update the server lists on all of the servers U, V, W, and X with a new server list <U, V, W, X, and Z>. However, the update is considered successful if only a quorum (e.g., at least a simple majority) of the servers on the initial list is updated; that is, for example, the update is considered successful if three out of the four servers U, V, W, and X are updated. Once at least a quorum of the initial list of servers is updated, the server list on server Z is updated. After the lists are updated on the servers, the lists on the clients can then be updated. If at least a quorum of servers is not updated, then a rollback may be implemented and/or the failover process may be repeated until it is successful.

Figure 5A:
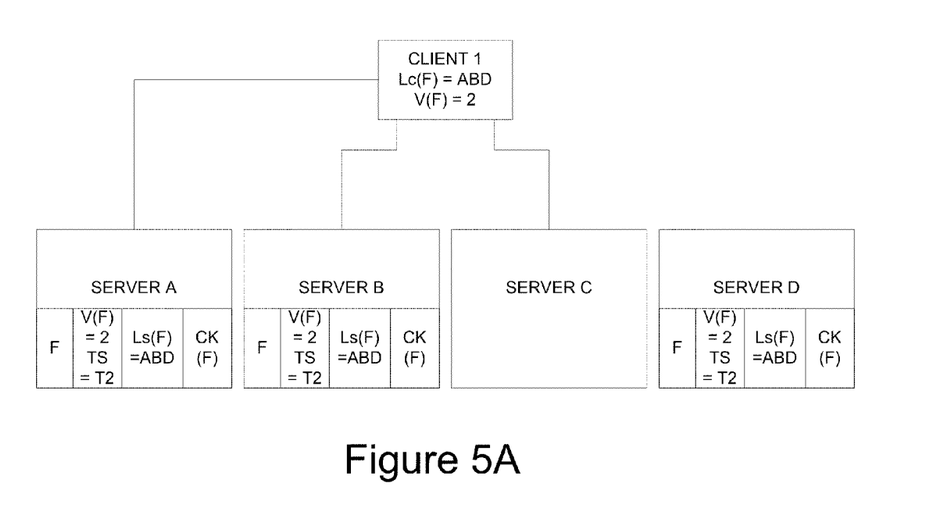
FIGS. 5A and 5B are block diagrams depicting data being written to replicated files according to an embodiment of the present disclosure.

Returning to FIG. 3, after failover is completed at time T2, the file F is replicated on server D and client 1 is informed that server D has replaced server C. Also, the list Ls on each of the servers A, B, and D is updated to include listings for servers A, B, and D. Consequently, in block 308 and with reference also to FIG. 5A, the list Lc maintained by client 1 can be updated to include listings for servers A, B, and D. As mentioned above, client 1 can communicate the new list Lc to other clients (e.g., client 2) in a best effort manner. Version numbers and time stamps can also be updated, as shown in FIG. 5A.

Figure 5B:
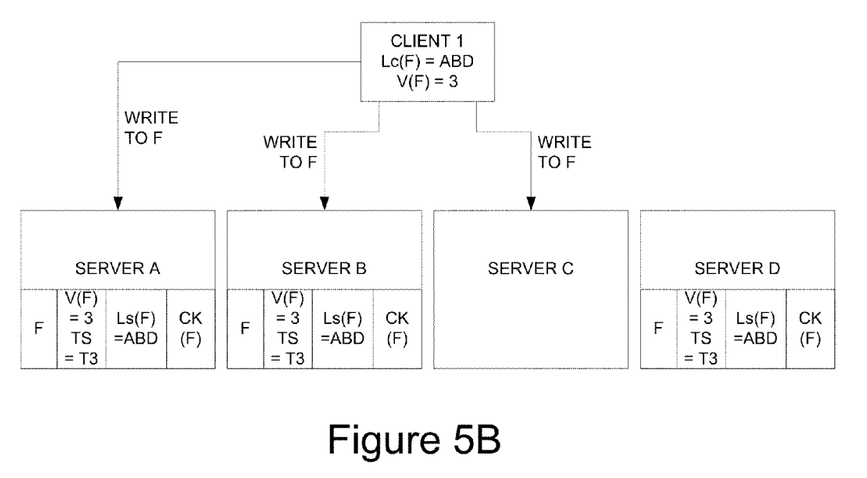

In block 310, at time T3, client 1 writes (or attempts to write) data to each copy of the file F on servers A, B, and D. The write is considered successful if the file F is successfully updated on a quorum (e.g., at least a simple majority) of the servers A, B, and D. After a copy of the file F is successfully modified, the version number V and time stamp TS associated with that copy are updated, and new file validation information CK is computed for that copy, as shown in FIG. 5B. The list of servers on the servers is also updated.

As noted above, the examples of FIGS. 3, 4A, 4B, 5A, and 5B are based on the premise that client 1 is available and knows on which server nodes the file F is replicated. Alternatively, client 1 may be out of touch (e.g., offline) for some reason and so may not be aware that file F is now replicated on server D instead of server C. Also, client 2 may also be out of touch and so may not receive the new list from client 1. Despite such circumstances, clients 1 and 2 will, generally speaking, be able to locate the most recent version of the file F, as will be seen from the discussion of FIGS. 6 and 7, below.

Referring to FIG. 5B, for example, a read can be performed and will be successful if the file F can be accessed from any two or all three of the servers A, B, and D. Before reading the data from any of the replica files, the file validation information CK associated with each copy of the file can be used to verify that that copy of the file is correct and complete. If the file is not correct, then another file with the same version is read and checked.

For a write to be successful, at least a quorum of the current versions of the file F is written completely. Thus, in the example of FIG. 5B, the write is successful if the file F is completely written to any two or all three of the servers A, B, and D. Once a copy of the file is completely written, the file validation information CK associated with that copy may be computed and stored along with the file.

In one embodiment, reads and updates to the server lists and/or file are interlocked. While the proposed logic does not depend upon it, not having a lock increases the complexity of the implementation (e.g., the server list or file might be changing while a client is reading it). Standard locking mechanisms can be employed, and getting a lock on a quorum of servers in the server list can be treated as success.

Special care is taken when updating the server list. First, a client (the primary client) that will update the server list is identified (standard, known mechanisms may be used to select the primary client from between multiple contending clients, even in split-brain situations). The primary client then arrives at a new server list by determining what the consistent and/or latest server list is (the choice of primary client might influence the final decision). The primary client will then update the server list on each accessible server in the old/new server list (an update succeeds if a quorum of servers—at least a simple majority—can be updated). The primary client might employ locking mechanisms before updating the server list.

With proper interlocks between clients, updates to the server list and/or file content would appear as atomic to clients other than the one making the updates. Thus, version inconsistencies will be transparent to most clients. Clients will either find that a quorum of servers in the server list is accessible and has the latest data, or will stop the process of searching for the latest data (perhaps to try again later) because they cannot access a quorum of servers in the server list. The logic doesn't depend upon interlocks but their use simplifies implementation/validation.

Figure 6:
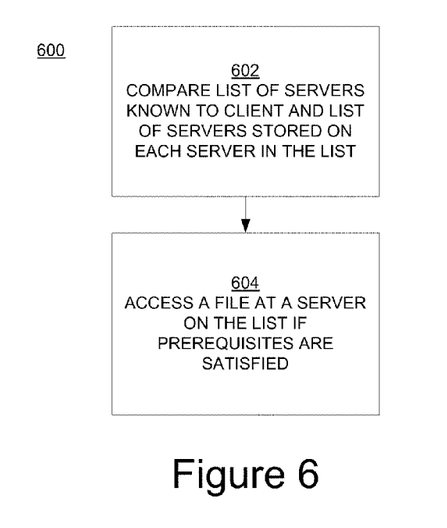
FIG. 6 is a flowchart illustrating an embodiment of a computer-implemented method for accessing replicated files.

FIG. 6 is a flowchart 600 illustrating an embodiment of a computer-implemented method for accessing replicated server-based files. Although described in the context of data files, embodiments described herein can be generally applied to other forms of replicated content, including the list of servers described herein. Flowchart 600 can be implemented as computer-executable instructions residing on some form of computer-readable storage medium (e.g., in a memory subsystem or unit of the system 210 of FIG. 2). More specifically, the method described by the flowchart 600 can be performed by any of the client nodes of FIG. 1.

In block 602, a list of servers known to a client node at a particular point in time, and each list of servers Ls stored on each of the servers that are included in the list of servers known to the client at that point in time, are compared. For clarity of discussion, the list of servers known to a client at a particular point in time or during a particular phase of the search/discovery process may be referred to as the client's working list. The client's working list can change over time. The list cached on the client can be replaced with the current version of the client's working list at any point during the client's search for the most recent version of a replicated file. That is, as part of the search/discovery process (as part of the process to identify the latest version of a replicated file), the list of servers known to the client may, and generally will, evolve during each phase of the search. Additional information is provided in conjunction with the examples of FIG. 7.

In block 604 of FIG. 6, according to embodiments of the present disclosure, a client is allowed to access a file F (also referred to as the file of interest) from a server on the list of servers known to the client if at least the first prerequisite below is satisfied and optionally if the second prerequisite is satisfied.

i) A quorum (e.g., at least a simple majority) of the servers have an "identical" version of the server list and/or file. Various means can be used to determine that the server lists and/or files are identical. For example, in lieu of a brute force (e.g., byte-by-byte) comparison, checksums, time stamps, and/or version numbers may be used to demonstrate that the data matches. If the quorum does not agree, then the latest version of the server lists should, in general, be used as the next of the client's working list Lc. This next working list is only an interim version—that is, there is still a need to check if a quorum of servers on that working list agrees or not.

ii) The version of the file on the server is at least as recent as any other version of the file stored on any other of the servers in the quorum of servers accessed by the client.

In general, a client starts with a list of servers. If a quorum (e.g., at least a simple majority) of the servers has an identical list (as demonstrated using a version number, time stamp, checksum, etc.), then that is the latest version of the list and a replicated file can be accessed from any server on that list. Otherwise, that list becomes the next working list and the process repeats. However, if the next list matches the current working list, and the condition above is satisfied, then the next list is the latest version of the list.

If the above prerequisites are satisfied, then the file F can be read. If these prerequisites are not satisfied, then the client continues to search for the most recent version of the server-based lists Ls and hence the most recent version of the file F, or stops searching if a quorum cannot be found. In general, there are two possible outcomes: a) the latest server list and/or file version is located; or b) the process halts because it cannot locate the latest. In the latter case, the client can wait a period of time and then retry.

When data (server list version or file version) between two servers does not match, a deterministic logic is applied to determine which of the two versions is the latest (a checksum, version number, timestamp, and other such well known mechanisms can be used to make the determination). When it is not possible to make the determination, it is possible to try each of the lists in turn to see which list leads to the most recent and consistent server list. Any inconsistency between two servers is temporary in nature, because the primary client will make sure that all copies (server list and/or file data) in accessible servers will be made identical. Two servers will be rendered consistent only if: 1) the primary client is able to determine a consistent version of the list, and 2) one of the two servers is not on the most recent, consistent version of the list (servers from old lists do not get updated).

The discussion above is illustrated by way of the examples of FIG. 7. For simplicity of discussion, the examples are discussed in the context of a single file of interest (file F) that is replicated on three server nodes; however, the present disclosure is not so limited. Also, although events are depicted and described as occurring in a certain order, embodiments according to the present disclosure are not so limited. The events and the sequences of events described in conjunction with FIG. 7 are selected to illustrate the principles of the present disclosure by way of example; the examples can be readily extended to other (similar) events and event sequences.

With reference to FIG. 7, at time T0, clients 1 and 2 both store a list Lc that includes servers A, B, and C. Each of the servers A, B, and C stores a copy of a file F—the file F is replicated on each of the servers A, B, and C. A list of servers Ls is stored with (associated with) each copy of the file F. A first version number is associated with each file (the version number for the file is the number in parentheses in FIG. 7). In the example of FIG. 7, a second version number is associated with each server list (the version number for the server list is the number in brackets in FIG. 7). In the example of FIG. 7, at time T0, the servers A, B, and C each cache a list that includes servers A, B, and C, and version 1 of the replicated files is stored on those servers.

At time T1, client 1 (in the role of primary client) learns that server C is inaccessible for some reason. As a result of the failover/replacement protocol in place, the file F is replicated on server D. Hence, the most recent version of file F (version 1) is on servers A, B, and D at time T1. Also, the server-based lists affiliated with file F on the servers A, B, and D are updated to include servers A, B, and D. In addition, the list on the client 1 that is affiliated with file F is updated—the list on client 1 includes servers A, B, and D. However, for the purposes of the example, client 1 is not able to communicate the updated list of servers to client 2; thus, the list on client 2 affiliated with file F still includes servers A, B, and C. Also, the list on server C that is affiliated with file F still includes servers A, B, and C.

At time T2, for the purposes of this example, the list on client 2 is updated. At time T2, the latest version of the replicated file is still version 1.

At time T3, client 1 (in the role of primary client) learns that server A is, for some reason, inaccessible to the clients 1 and 2. As part of the failover protocol in place, the file F is replicated on server E. Hence, the most recent version of file F (version 1) is on servers B, D, and E at time T3. Accordingly, for file F, the lists of servers stored on the servers B, D, and E are updated to include servers B, D, and E. In addition, the list on client 1 is updated—the list on client 1 includes servers B, D, and E. However, for the purposes of this example, client 1 is not able to communicate the updated list of servers to client 2; thus, the list on client 2 still includes servers A, B, and D. Also, the list of servers stored on server C still includes servers A, B, and C, and the list of servers stored on server A still includes servers A, B, and D.

At time T4, client 1 writes to file F on servers B and E, but is unable to access server D and hence cannot write to file F on server D. The write is considered successful because client 1 was able to write to a quorum (e.g., at least a simple majority) of the servers included on the latest list known to client 1. Hence, the most recent version of file F (version 2) is on servers B and E at time T4, but server D continues to store version 1 of that file. Note that a client needs to update its cached list of servers prior to a write. For example, at time T4, client 2 needs to update its server list before it can write to file F—client 2 cannot write to a quorum of servers A, B, and D at time T4 and declare the write successful.

At time T5, as part of the failover protocol in place, the file F is replicated on server F (server F replaces server D). Hence, the most recent version of file F (version 2) is on servers B, E, and F at time T5. Also, for file F, the lists of servers on client 1 and servers B, E, and F are updated. For the purposes of this example, client 1 is still not able to communicate the updated list of servers to client 2; thus, the list on client 2 still includes servers A, B, and D. Also, the list of servers stored on server C still includes servers A, B, and C (and file version 1), and the list of servers stored on server A still includes servers A, B, and D (and file version 1).

At time T6, client 1 writes to file F on servers E and F, but is unable to access server B and hence cannot write to file F on server B. The write is considered successful because client 1 was able to write to a quorum (e.g., at least a simple majority) of the servers included on the list cached by client 1. Hence, the most recent version of file F (version 3) is on servers E and F at time T6.

At time T7, as part of the failover protocol in place, the file F is replicated on server G (server G replaces server B). Hence, the most recent version of file F (version 3) is on servers E, F, and G at time T7. Also, for file F, the lists of servers stored on the servers E, F, and G are updated to include servers E, F, and G. However, for the purposes of this example, client 1 is not able to communicate the updated list of servers to client 2; thus, the list on client 2 still includes servers A, B, and D. Also, the list of servers stored on server C still includes servers A, B, and C (and file version 1), the list of servers stored on server A still includes servers A, B, and D (and file version 1), the list of servers stored on server D includes servers B, D, and E (and file version 1), and the list of servers stored on server B includes servers B, D, and E (and file version 2).

At any time T0 through T7, client 2 can attempt to access the latest version of the file F. To best illustrate the principles of the present disclosure, a situation in which client 2 waits until time T7 to attempt to access the file F is described below. Time T7 is chosen to illustrate the principles of the present disclosure because, at time T7, the list of servers cached on client 2 is completely different from the list cached on client 1, and also the most recent version of the file F (version 3) is not stored on any of the servers included in the list cached on client 2.

To access file F at time T7, client 2 would undertake the following actions. First, client 2 would attempt to access all of the servers identified in the list cached by client 2. That is, client 2 would attempt to access servers A, B, and D. To be successful, client 2 would access at least a quorum of the servers included in the list stored on client 2. That is, to be successful, client 2 can access either servers A and B, servers B and D, servers A and D, or servers A, B, and D. The latter scenario, in which all servers A, B, and D are accessed, can be disregarded for the purposes of this example because it is not as limiting as the other scenarios.

If a quorum of servers on the client's working list cannot be accessed, then client 2 may stop the search process and then begin it later (e.g., after the issue with server accessibility has been resolved, or after client 2 receives another, later version of a server list from another client).

If client 2 accesses servers A and D only, for example, then client 2 would learn that there is a different and later version of the server list on server D; the list on server A can therefore be disregarded). If client 2 accesses servers A and B only, for example, then client 2 learns that there is a different and later version of the server list on server B. If client 2 accesses servers B and D only, for example, then client 2 learns that there is a different and later version of the server list on server B and another version of the server list on server D.

In any of the above scenarios, the prerequisites discussed in conjunction with FIG. 6 are not satisfied. Consequently, the list known to client 2 (its working list, which includes servers A, B, and D) is not the latest version of the list. Thus, client 2 will continue to search for a more recent list of servers.

To continue the search, client 2 can update its working list to reflect the version of the list stored on server B, because the list stored on server B is more recent (has a higher version number) than the list stored on server D. In general, at any point in the search process, the client's working list is the same as the latest version of the server list observed by the client on any server accessed by the client up to that point. Client 2 then can attempt to access all of the servers identified in the list cached by server B. Thus, client 2 would attempt to access servers E and F, having already accessed server B. To be successful, client 2 would access at least a quorum of the servers included in its working list. Note that, even though client 2 has already accessed server B and would need to access only server E or server F to complete a quorum, client 2 will generally attempt to access both server E and server F.

If client 2 accesses server E, for example, then client 2 would learn that the version of the server list on server E is different from and later than the list known to client 2 at this point in the process (the list known to client 2 at this point in the process includes servers B, E, and F). If client 2 accesses server F, for example, then client 2 would learn that the version of the server list on server F is different from and later than the list known to client 2 at this point in the process (as just noted, the list known to client 2 at this point in the process includes servers B, E, and F).

Note that, in lieu of or in addition to accessing the servers on the list cached on server B, client 2 could attempt to access all of the servers identified in the earlier version of the server list cached by server D. However, such a step is redundant and therefore unnecessary when a version number for each server list is available, because such a step would also lead client 2 to at least server E.

To summarize to this point in the process, the discovery process undertaken by client 2 has reached at least server E (referred to as scenario 1 in the following discussion) and possibly both servers E and F (referred to as scenario 2 in the following discussion).

In scenario 1, in which client 2 has accessed server E (along with servers B and D), the list known to client 2 (the current working list, which includes servers B, D, and E) is not the latest version of the list; the version on server E is later. Thus, client 2 will continue to search for a more recent list of servers. Having already explored the lists on servers B and D as described above, client 2 will explore the list on server E. Thus, client 2 will attempt to access all of the servers identified in the list cached by server E. That is, client 2 would attempt to access servers F and G. To be successful, client 2 would access at least a quorum of the servers included in the list stored on server E. In the example of FIG. 7, to be successful, client 2 would access either server F or server G (having already accessed server E). At this point in the process, the server list known to the client (the next version of the working list, which includes servers E, F, and G) matches the latest version of the list found on a quorum of the servers on the client's current working list. Thus, client 2 recognizes that it has discovered the latest version of the server list. Viewed from a different perspective, any further searches performed by client 2 based on the list known to the client at this point in the process will continue to lead only to servers E, F, and G.

In scenario 2 referred to above, in which client 2 has accessed both servers E and F, the list known to the client according to that sequence of events includes servers B, E, and F. Like scenario 1, the list known to client 2 is not the latest version of the list; the versions on servers E and F are later. Thus, client 2 will continue to search for a more recent list of servers. Having already explored the lists on servers E and F as described above, client 2 will explore the list on server G. Thus, client 2 will attempt to access all of the servers identified in the list cached by server G. The list of servers known to the client now includes servers E, F, and G. Thus, at this point in the process, the server list known to the client (which includes servers E, F, and G) matches the lists on a quorum of the servers on the client's list. Thus, client 2 recognizes that it has discovered the latest version of the server list. Viewed from a different perspective, any further searches performed by client 2 based on the list known to the client will continue to lead only to servers E, F, and G.

As mentioned previously herein, and as shown by the examples just discussed, the use of a separate version number for the server list (in addition to the version number associated with the file of interest) facilitates the search for the latest version of the server list, but a separate version number for each server list is not a requirement. Absent a separate version number for the server list, the client can access different combinations (different quorums) of servers on each list accessed by the client until it reaches a point in the search process at which further searches do not uncover a different version of the server list. For instance, in the example of FIG. 7, client 2 may begin its search with a server list that includes servers A, B, and D, as described above. To be successful, client 2 will access at least servers A and B, servers B and D, or servers A and D. Without a version number for the server lists found on the servers A, B, and D, client 2 can explore respective quorums of servers identified on those lists. Thus, in the second phase of the search, client 2 will explore combinations of servers selected from the list on server B (which includes servers B, E, and F) and from the list on server D (which includes servers B, D, and E), where each combination of servers includes at least a quorum of the servers from the respective lists (in this example, the list on server A need can be removed from further consideration because it is the same as the list already known to client 2). In the third phase of the search, client 2 will explore combinations of quorums of servers selected from the list on server E (servers E, F, and G) and from the list on server F (also servers E, F, and G) (in this example, the lists on servers B and D need not be explored again). In the fourth phase of the search, client 2 will explore combinations of quorums of servers selected from the list on server G (again, servers E, F, and G) and from the list on server F (servers E, F, and G) (in this example, the lists on servers E and F need not be explored again). As can be seen, the search conducted by client 2 without the use of server list version numbers has reached the same conclusion as the search conducted by client 2 with the use of server list version numbers. However, the search conducted using version numbers for the server lists can, in general, be accomplished more efficiently.

The latest version of the server list returned by the process just described is timing-dependent. For example, a client that starts the process at time T6 and completes the process before time T7 will conclude (correctly) that the latest version of the server list includes servers B, E, and F. This does not eliminate the need for coordination between active clients. Also, if the latest version of the server list is not the same on all servers that store the replicated file of interest, then it is advantageous to make the server lists identical. In addition, if the file version is not the same on all servers in the latest server list, it is necessary to make the file identical on those servers before further changes to the file are permitted.

Returning to the example of FIG. 7, having identified the latest list of servers, client 2 then accesses a quorum of servers on the list to identify the latest version of the replicated file F. At time T7, the latest version of the file F is version 3—version 3 is stored on all of the servers E, F, and G in the most recent list of servers. However, this might not always be the case. For example, at time T6, the latest version of the server list includes servers B, E, and F, but server B stores version 2 of the file, while servers E and F store version 3 of the file. Thus, in general, client 2 accesses at least a quorum of the servers on the latest list of servers to identify/confirm which version of the file is the latest version; the latest version of the replicated file is the version found on a quorum of the servers. As noted previously herein, the latest version of the replicated file can be identified using a version number as in the examples above, or using a time stamp, or using a combination of a version number and a time stamp.

Thus, in the example of FIG. 7, a read can be performed and will be successful if the file F can be accessed from any two or all three of the servers E, F, and G. Before reading the data from any of the replica files, the file validation information CK associated with each copy of that file can be used to verify that that copy of the file is correct and complete. If the file is not correct, then another file with the same version is read and checked. Note that, during the search process described above, the entire contents of the data files are not necessarily read at each phase of the search; instead, perhaps only the version information associated with the data files may be read, thus saving time and conserving processing resources. Other information, such as a write in progress tag, may also be read. The use of file validation information to detect incomplete or invalid file replicas also improves performance because only a single file with correct validation information needs to be read by the client. In some instances, checksums as well as file versions are compared—both should match other files with the same version number.

For a write to be successful, at least a quorum of the current versions of the file F is written completely. Thus, in the example of FIG. 7, the write is successful if the file F is completely written to any two or all three of the servers E, F, and G. Once a copy of the file is completely written, the file validation information CK associated with that copy may be computed and stored along with the file.

In one embodiment, reads and updates to the server lists and/or file are interlocked. While the proposed logic does not depend upon it, not having a lock increases the complexity of the implementation (e.g., the server list or file might be changing while a client is reading it). Standard locking mechanisms can be employed, and getting a lock on a quorum of servers in the server list can be treated as success.

Thus, according to embodiments of the present disclosure, to find the most recent version of the replicated file F, a client contacts, or attempts to contact, a quorum (e.g., at least a simple majority) of the servers included in the list Lc cached by that client or in the client's working list. In actuality, the client attempts to contact all of the servers included in the list known to the client, but is considered successful if the specified quorum is contacted. In one embodiment, the client accesses the lists of servers on each server it has contacted and the version information affiliated with the replicated file F. That is, it is not necessary to read the data in the file F at this point; the server-based lists and the version information are sufficient for continuing the search for the latest version of the file F.

After reading the version information, the client reads the list of servers on each server affiliated with the file F (or which may be part of the file F) and checks to see if it has contacted the servers in the lists. If not, the client contacts the servers that were not previously contacted, as needed, and continues the process until the client finds a valid copy of the file F.

A novelty of present disclosure lies in the ability to allow a client to find the most recent version of a replicated file F even if the server list Lc cached by the client is stale. As long as some of the servers in the client's working list are online, then the client can find the most recent version of the file even if the server list cached by the client does not include any of the servers on which that most recent version of the file is stored. Success is guaranteed only if a simple majority of the servers on the clients list (and a simple majority of the servers in each succeeding version of the list) are online, but success is possible if only one of the servers is online, and likely if two or more servers are online (at least one of them is likely to have caught the update to the next version). Importantly, the client cannot come to an incorrect conclusion as to the current version of the file—the client may halt, but it will not get a wrong answer. Should a quorum of servers on the client's cached list not be available, the client can still attempt to contact another client to get its list and, using that list as a starting point, can invoke the processes described above to get the latest list.

By using a novel combination of quorum-based search techniques, version information, and file validation information, a client can efficiently locate the most recent and valid (consistent) version of replicated data without external assistance, even in the presence of server failures, and/or even if the client has been offline for some time.

Figure 8:
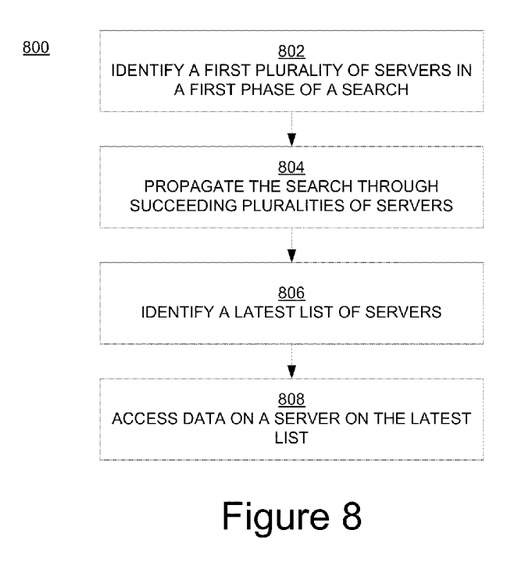
FIG. 8 is a flowchart illustrating an embodiment of a computer-implemented method for managing replicated data.
Figure 9:
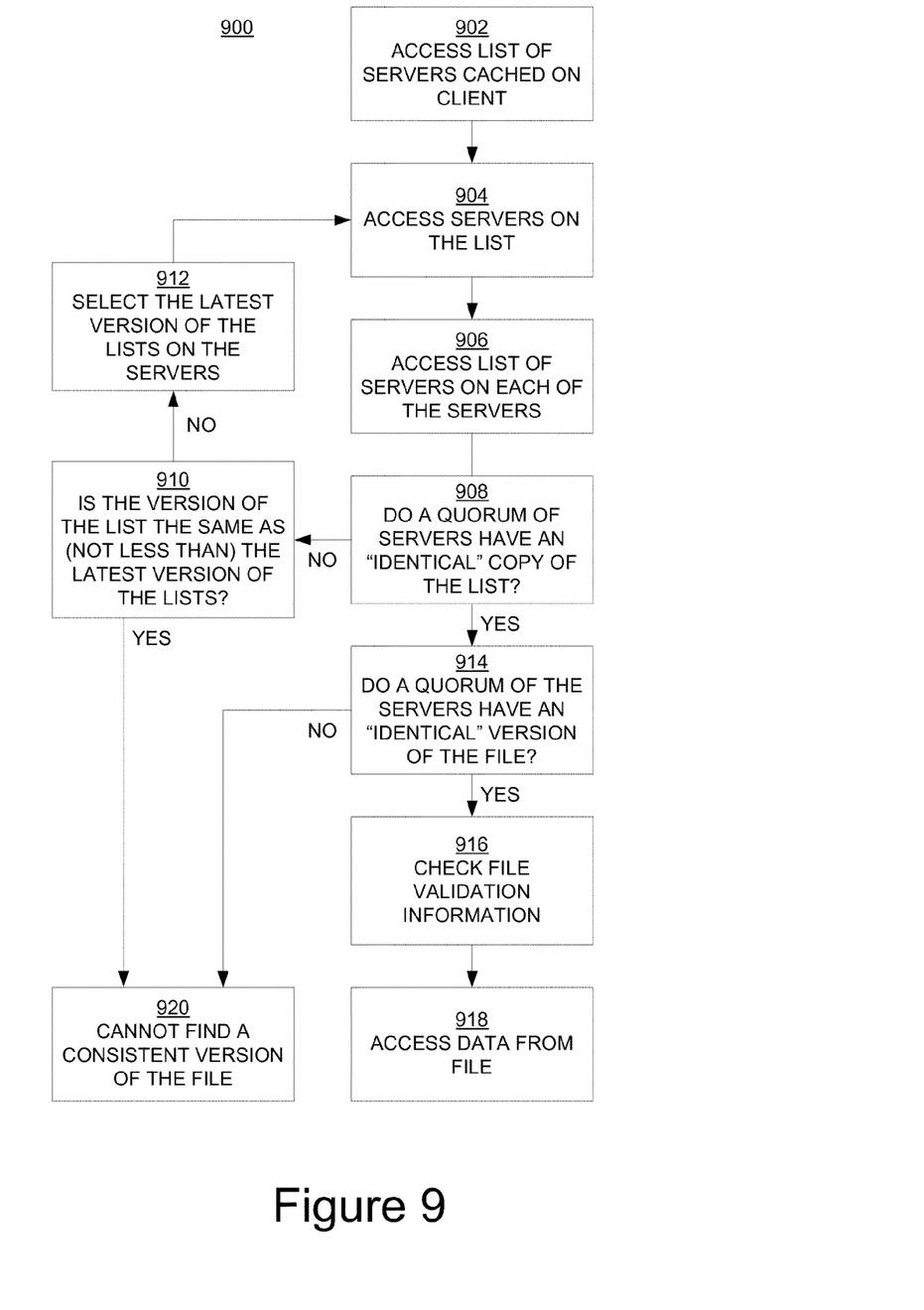
FIG. 9 is a flowchart illustrating an embodiment of a computer-implemented method for managing replicated data.

FIGS. 8 and 9 are flowcharts 800 and 900, respectively, illustrating embodiments of computer-implemented methods for managing replicated data. Although described in the context of data files, embodiments described herein can be generally applied to other forms of replicated content, including the list of servers described herein. Flowcharts 800 and 900 can be implemented as computer-executable instructions residing on some form of computer-readable storage medium (e.g., in a memory subsystem or unit of the system 210 of FIG. 2). More specifically, the methods described by the flowcharts 800 and 900 can be performed by any of the client nodes of FIG. 1. Not all of the steps included in the flowcharts 800 and 900 may be performed, and the steps may be performed in a different order than described.

With reference first to FIG. 8, in block 802, a first plurality of servers is identified during a first phase of a search for lists of servers. In block 804, the search is propagated through succeeding pluralities of servers, where each succeeding plurality of servers is selected based upon the list of servers stored on each server or servers identified in a preceding phase of the search.

In block 806, the latest list of servers is identified, where the latest list is selected from lists of servers identified during the search. In block 808, data stored on a server included in the latest list can be accessed.

More specifically, with reference to FIG. 9, in block 902, the client accesses a list of servers cached on the client. In block 904, the client accesses the servers on the cached list. In one embodiment, the client accesses a quorum (e.g., at least a simple majority) of the servers on the cached list.

In block 906, the client accesses a list on each of the servers contacted in block 904. In block 908, a determination is made with regard to whether at least a quorum of servers have an identical copy of the list (mechanisms such as version numbers, time stamps, checksums, etc., can be used to determine if lists on the servers are considered to be identical). If a quorum of servers has identical copies of the list, then the flowchart proceeds to block 914; otherwise, it proceeds to block 910.

In block 910, in one embodiment, a determination is made with regard to whether the version number for each list of servers on each of the contacted servers, or for each list of servers on at least a quorum of the contacted servers, is the same as (not greater than) the version number for the list of servers known to the client at that point in the search process. If so, then although the version numbers are the same, the lists may not be the same, in which case the search is inconclusive with regard to which of the lists is the most recent, accordingly, a consistent version of the file cannot be found (block 920). Otherwise, the flowchart proceeds to block 912.

In block 912, one of the later versions of the lists (specifically, the latest version of those lists) identified in blocks 906 and 910 is selected. The flowchart 900 then returns to block 904.

In block 914, each server on the final list, or at least a quorum of the servers on that list, is contacted. The copy of the file of interest on each of those servers can be accessed and the latest version of that file can be identified using the version information (version number and/or time stamp) associated with each replica of the file. A determination is made with regard to whether at least a quorum of the servers has an identical version of the file. If not, the flowchart proceeds to block 920; otherwise, the flowchart proceeds to block 916.

In one embodiment, in block 916, the file validation information (e.g., checksum) for each copy can be checked to make sure that the copy is valid, complete, and correct. In block 918, one of the valid copies is accessed and read. If writing, all copies or a quorum (e.g., at least a simple majority) of the copies must be written.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

For example, in addition to the embodiments described above, the server list may be atomically changed only if all, or a quorum of, the clients agree. In another embodiment, in addition to atomically changing the server list as just described, clients can communicate among themselves to identify the latest server list. In other words, the process described in conjunction with FIG. 7, for example, can be utilized across the client nodes instead of across the server nodes as described. In yet another embodiment, the approach described above can be applied on top of the logic utilized in peer-to-peer systems.

Although described in the context of data files, embodiments described herein can be generally applied to other forms of replicated content, including the list of servers described herein.

Embodiments according to the invention are thus described. While the present disclosure has been described in particular embodiments, it should be appreciated that the invention should not be construed as limited by such embodiments, but rather construed according to the below claims.

What is claimed is:

1. A non-transitory computer-readable storage medium that stores computer-executable instructions for causing a computer system to perform a method comprising:
    accessing a data structure stored on a client that identifies a current group of servers, wherein each server of said current group of servers stores at least one version of a file;

accessing a first majority of said current group of servers, wherein each accessed server in said first majority stores a data structure that identifies a group of servers;

identifying an updated group of servers, wherein identifying said updated group comprises determining that a majority of said first majority of servers store a data structure that identifies an identical group of servers; and accessing a version of said file stored on a server included in said first majority of servers after said updated group of servers is identified.

2. The non-transitory computer-readable storage medium of claim 1 wherein said method further comprises determining whether said version of said file on said server is at least as recent as any other version of said file stored on any other server of said first majority of servers.

3. The non-transitory computer-readable storage medium of claim 1 wherein said version of said file is indicated using a version number.

4. The non-transitory computer-readable storage medium of claim 1 wherein said version of said file is indicated using a time stamp.

5. The non-transitory computer-readable storage medium of claim 1 wherein said method further comprises computing a checksum for said file.

6. The non-transitory computer-readable storage medium of claim 1 wherein said current group of servers comprises a distributed file storage system and wherein said file comprises data.

7. A computer-implemented method for managing data, said method comprising:

during a search for an updated list of servers that store a latest version of a file, accessing a data structure stored on a client that identifies a current group of servers, wherein each server of said current group of servers stores at least one version of a file;

identifying an updated group of servers, wherein identifying said updated group comprises determining that a majority of said first majority of servers store a data structure that identifies an identical group of servers;

propagating said search and said identifying said updated group through succeeding groups of servers upon determining that less than a majority of said first majority of servers store a data structure that identifies an identical group of servers, wherein each succeeding plurality of servers is selected based upon data structures identifying groups of servers stored on servers identified in a preceding phase of said search; and accessing a version of said file stored on a server included in said first majority of servers after said updated group of servers is identified.

8. The computer-implemented method of claim 7 wherein said propagating comprises:

comparing data structures identifying groups of servers stored on said first majority of servers to identify which of said data structures stored on said first majority of servers is a most recent data structure; and selecting a data structure from said most recent data structure stored on said first majority of servers.

9. The computer-implemented method of claim 8 wherein said comparing further comprises:

accessing a new group of servers included on a new data structure identifying said new group of servers stored on a computer system, each of said servers in said new group having stored thereon a data structure identifying a group of servers;

accessing the data structures identifying groups of servers stored on said new group of servers; and accessing a version of a file comprising said data from a server in said latest group of servers if at least a majority of said data structures identifying groups of servers stored on said new group of servers are identical.

10. The computer-implemented method of claim 9 further comprising determining whether said version of said file on said server is at least as recent as any other version of said file stored on any other of said servers in said new group of servers.

11. The computer-implemented method of claim 7 wherein said version of said file is indicated using a version number.

12. The computer-implemented method of claim 7 wherein said version of said file is indicated using a time stamp.

13. The computer-implemented method of claim 7 further comprising computing a checksum of said data.

14. The computer-implemented method of claim 7 wherein said data is replicated on multiple servers, wherein each of said multiple servers is identified in said updated group of servers.

15. A computer system comprising:

a processor; and memory coupled to said processor and having stored therein instructions that, if executed by said computer system, cause said computer system to execute a method of managing data, said method comprising:

accessing a data structure stored on a client affiliated with a first data file, said data structure identifying a current group of servers on which replicas of said first data file are stored;

attempting to write data to a set of said replicas stored on a subset of said current group of servers, wherein said attempting to write is successful only if said subset comprises at least a majority of said current group of servers;

identifying a set of replicas that are successfully written to;

affiliating a data structure that identifies an updated group of servers with said set of replicas that are successfully written to, wherein said data structure that identifies an updated group of servers and said replicas are stored on said updated group of servers; and attempting to read data from a replica stored on a server of said updated group of servers, wherein said read is permitted only if a majority of said set of replicas that are successfully written to are accessed during said attempting to read.

16. The computer system of claim 15 wherein said method further comprises associating version information with said replicas, wherein said version information comprises a version number.

17. The computer system of claim 15 wherein said method further comprises associating version information with said replicas, wherein said version information comprises a time stamp.

18. The computer system of claim 15 wherein said method further comprises computing a checksum for each of said replicas.

19. The computer system of claim 15 wherein said first plurality of servers comprises a distributed file storage system.

* * * * *